United States Patent [19]

Collins et al.

[11] Patent Number: 4,847,749

[45] Date of Patent: Jul. 11, 1989

[54] JOB INTERRUPT AT PREDETERMINED BOUNDARY FOR ENHANCED RECOVERY

[75] Inventors: Robert W. Collins, Rochester; William S. Davidson, Oronoco; Steven M. Dickes, Rochester; James S. Effle, Rochester; Carle J. Larson, Rochester; Russell J. Weinschenk, Rochester; Peter M. Wottreng, Rochester, all of Minn.

[73] Assignee: International Business Machines Corporation, Armonk, N.Y.

[21] Appl. No.: 873,909

[22] Filed: Jun. 13, 1986

[51] Int. Cl.[4] ............... G06F 11/00; G06F 11/30; G06F 11/32; G06F 11/34
[52] U.S. Cl. .................................. 364/200; 364/300
[58] Field of Search ... 364/900 MS File, 200 MS File

[56] References Cited

U.S. PATENT DOCUMENTS

| | | | |
|---|---|---|---|
| 3,736,566 | 5/1973 | Anderson et al. | 364/200 |
| 4,044,337 | 8/1977 | Hicks et al. | 364/200 |
| 4,458,307 | 7/1984 | McAnlis et al. | 364/200 |
| 4,665,520 | 5/1987 | Strom et al. | 371/7 |
| 4,674,038 | 6/1977 | Brelsford et al. | 364/200 |
| 4,697,266 | 9/1987 | Finley | 364/200 |

OTHER PUBLICATIONS

Verhofstad, J. S. M. "Recovery Techniques for Database Systems", Computing Surveys, vol. 10, No. 2 (Jun. 1978), pp. 167-195.

Crus, R. A. "Data Recovery in IBM Database 2", IBM System Journal, vol. 23, No. 2 (1984), pp. 178-188.

Primary Examiner—Raulfe B. Zache
Assistant Examiner—Robert B. Harrell
Attorney, Agent, or Firm—Bradley A. Forrest

[57] ABSTRACT

A recovery mechanism restarts jobs following correction of a system failure and automatically marks the jobs for interruption at a logical boundary. The logical boundary is above logical file updating functions such that logical files are in a known state when jobs reach the boundary. When a system failure is detected which has not yet resulted in lost data, an image of working memory, including hardware status is saved on nonvolatile storage. After the failure has been resolved, the system is initially loaded with operating programs (IPL) and working memory is reloaded from the nonvolatile storage. All jobs which were reloaded are marked for interrupt at a machine instruction boundary, and processing is started. After all jobs have reached the boundary, or a predetermined time has elapsed, processing is stopped and the system is re-IPLed. There are few system index recoveries to be performed, since most jobs reached a point where logical files were synchronized with corresponding data.

15 Claims, 9 Drawing Sheets

JOB INTERRUPT AT PREDETERMINED BOUNDARY FOR ENHANCED RECOVERY

Reference is made to a copending patent application: "Index Key Range Estimator", Ser. No. 871,637, filed June 6, 1986, and assigned to the same assignee as the present application."

BACKGROUND OF THE INVENTION

The invention relates to computer system recovery from an undesirable condition and in particular to restarting the computer system with minimal need for logical file rebuilding.

In a computer system which uses logical files such as directories to index large amounts of data, a system failure, such as loss of power, or auxiliary storage failure, can result in the logical files being in an unknown condition. Past solutions to this problem have involved rebuilding the logical files from the data. This solution has involved a great deal of time to return the system to operation because of all the data needed to be read to regenerate the logical files. A further solution has involved the use of journaling transactions. This solution added overhead on I/O (Input/Output) operations and generally adversely affected performance of the system.

Individual jobs running on the system have made use of job checkpoint/restart marking to cause a job to stop at a predetermined point prior to updating logical files. This resulted in the logical file related to the job to be in a known condition at all times. Recovery was then easy for that particular job. Other jobs not so marked by their owners were not so fortunate. The individual checkpoint/restart was always present, so overall performance was affected during normal operation of the system.

SUMMARY OF THE INVENTION

A recovery mechanism restarts jobs following correction of a system failure and automatically marks the jobs for interruption at a logical boundary which is above logical file updating functions such that logical files are in a known state. No performance degradation results from the mechanism during normal operation of the system, and long logical file rebuilding times are avoided.

When a failure is detected which has not yet resulted in lost data, an image of working memory, including hardware status is saved on nonvolatile storage. After the problem is corrected, the system is initially loaded with operating programs (IPL, meaning Initial Program Load) and working memory is reloaded from the nonvolatile storage. All jobs which were reloaded are marked for interrupt at a machine instruction boundary, and processing is started. When each job reaches the boundary, it is held there because each logical file it affected, such as an index, has been updated so that it is synchronized with the job. After all jobs have reached the boundary, or a predetermined time has elapsed, processing is stopped and the system is re-IPLed. There are few system index recoveries to be performed, since the system was quiesced at the instruction boundary. Some jobs which may not have reached the boundary, result in the logical files relating to them being rebuilt in a conventional manner.

In a further embodiment, a means of initiating marking all jobs for interrupt at a boundary is provided. When the system "hangs", (a term used to describe a system wait state or loop condition during which the user is unable to exert control of the system) jobs are marked for interrupt at a machine instruction boundary. When all the jobs have reached the boundary, the system is powered down. Powering down the system serves to resolve miscellaneous communications hardware problems which may actually have been the cause of the hang. A subsequent IPL places the system in a state of normal operation without the need to perform index recoveries.

DETAILED DESCRIPTION OF THE PREFERRED EMBODIMENT

Figure 1:
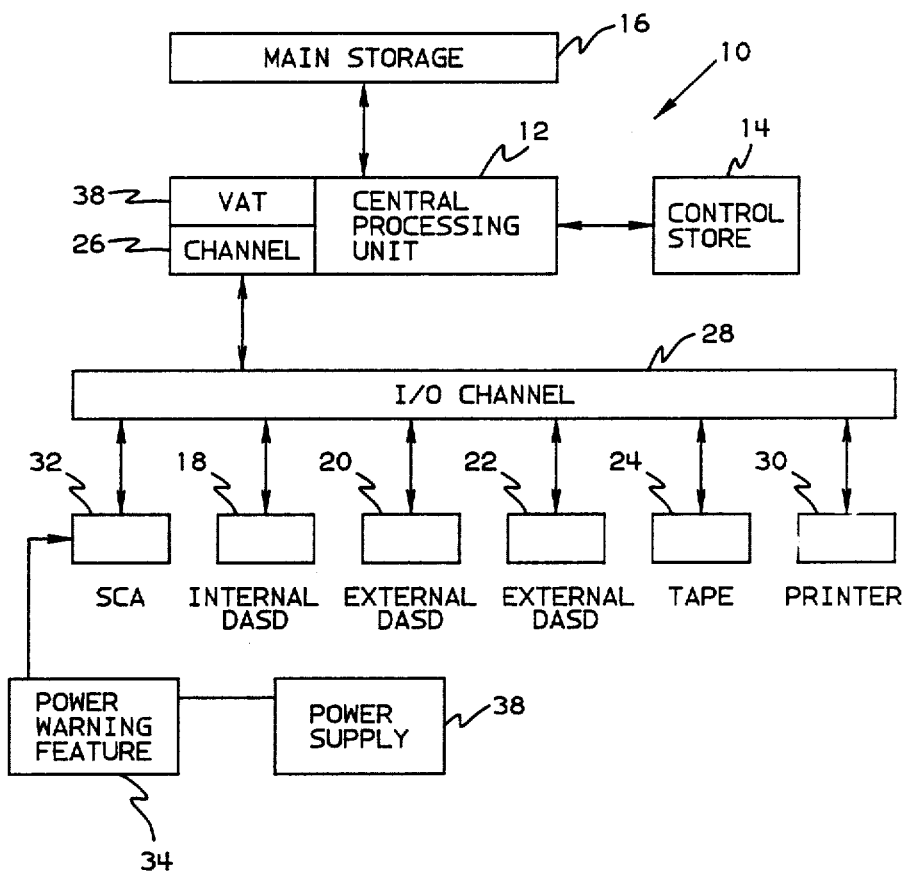
FIG. 1 is a block diagram of a computer system incorporating the automatic microcode completion mechanism.

A computer system incorporating an automatic job interrupt mechanism is indicated generally at 10 in FIG. 1 System 10 comprises a central processing unit (CPU) 12, which executes microcode instructions stored in a control store 14. A main storage 16 is coupled to the CPU 12 for providing fast access to data and high level instructions. A plurality of direct access storage devices (DASD) such as disk drives 18, 20 and 22, and a tape drive 24 are coupled to a channel card 26 in CPU 12 through an I/O (input and output) channel 28. DASD 18 is an internal disk drive device that contains a predetermined sector having a communications area. The communications area is used to contain messages for use at system start-up.

Other elements coupled to the CPU 12 through the I/O channel 28 include a printer 30 and a microprocessor based system control adapter (SCA) 32. The SCA 32 is a stand alone processor which controls system maintenance functions including console switches, start-up of hardware diagnostics, utility power monitoring through a power failure warning device 34 and loading of microcode into control store 14 from the disk drives.

A virtual address translator translates addresses for referencing main storage 16 to secondary direct access storage devices 18–22. In the preferred embodiment, all direct access storage devices are referenced by a single address range. A storage management microprogram performs all direct access storage I/O done by the system 10. A directory is used to relate all virtual addresses to their home locations on the direct access storage devices. If the directory is in flux when the system terminates, it may be necessary to recover it. Further data which may not be accurate when the system terminates comprises data base logical files. These logical files provide alternate user views of the physical data base stored on the direct access storage devices. A logical file may be mapped over one or more physical files, and comprises a static definition, such as format information for the data, and an access path which allows a user to see different views of the physical files. The logical file also contains an index of keys. An index in the present embodiment comprises a binary radix tree index. Each index comprises at least one logical page of data, 512 bytes, with multiple decision nodes leading to keys and page pointers to further pages of the index. The tree structure is further defined in a copending patent application: "Index Key Range Estimator" having an attorney docket number of R0985-030 (filed June 6, 1986) and assigned to the same assignee as is the present application. The tree structure is used for storage management directories, data base physical/logical files, user profiles, libraries, etc.

Storage management consists of microcode running from both the control store 14 and main storage 16. Microcode from the control store 14 directly controls the hardware of central processing unit 12. It is referred to as horizontal microcode (HMC). A higher level of microcode, referred to as vertical microcode (VMC), implements a machine instruction set. The vertical microcode in effect interfaces the machine instruction set to the horizontal microcode. The machine instruction set provides significant functionality such as copying files, creating programs and data base maintenance. The machine instruction set is the externally architected interface to the system 10.

Figure 9:
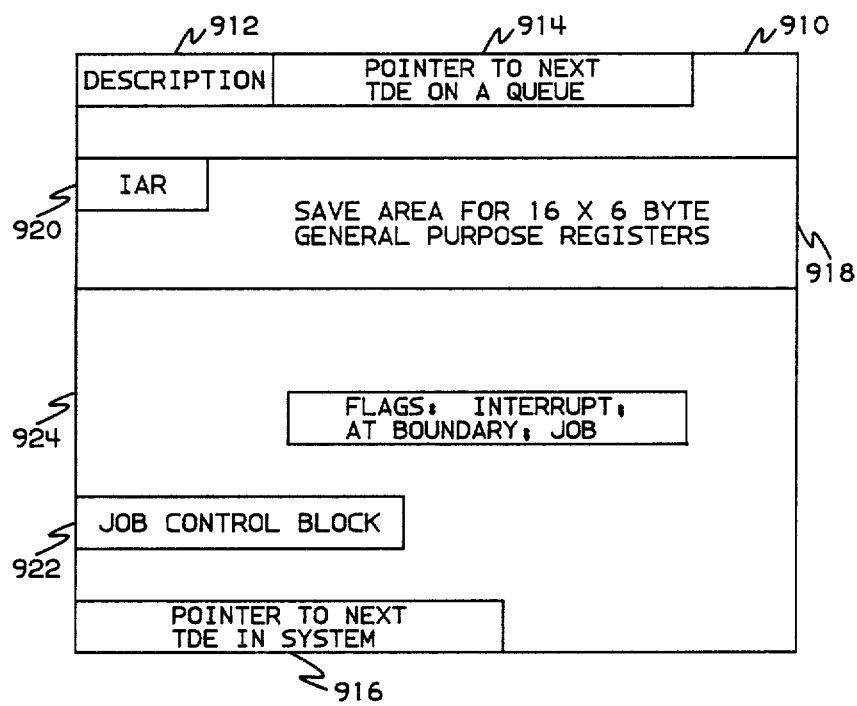
FIG. 9 is a block diagram of a task dispatching element associated with each task.

A group of VMC code and/or higher level instructions is referred to as a task. Tasks are given control of processor 12 through the use of a task dispatching queue (TDQ). An indication of which tasks are ready to gain control of processor 12 is contained on the queue in the form of task dispatching elements (TDEs) shown generally at 910 in FIG. 9. An area 912 in the TDE indicated at 912 describes the type of task represented, and contains a pointer at 914 to the next TDE on the same queue. All tasks on the system are forward linked to each other by use of pointers indicated at 016. Further information in the task dispatching elements includes hardware register values 918 for use when running the task, and an address value 920 indicating where to start the task. Jobs are tasks that use machine instructions, and are represented at 922. A machine instruction is VMC that may be running under a job. A number of flags at 924 will be described below.

All storage management involving changing user data and logical file updating functions occur below the machine instruction set boundary, in the vertical and horizontal microcode. Jobs are the only tasks that can invoke the microcode which changes customer data and logical files. Some instructions may run for several seconds to several hours. It is not likely that logical file updating by the microcode will be completed when a problem causes premature system shutdown.

An uninterruptible power supply (UPS) supplies power to essential components of system 10 for a short period of time when utility power is interrupted. Normal processing continues for short utility power interruptions. Then a timer expires indicating that UPS 38 can only continue to supply power for a short period of time. Components such as external storage devices and printers are not powered by UPS 38. The power supply 38 is not designed to continue operation of the system so that all jobs can be completed.

System 10 makes use of multitasking. The task dispatching queue (TDQ), used to swap tasks in and out of the processor 12, is maintained in main storage. Tasks, as represented by their task dispatching elements, are ordered on the queue. The top task on the queue receives control of processor 12. Tasks are placed on the TDQ when a user starts a job, or when they are referenced by another task. If a task sends a message to a send receive queue, the task the message is directed to wakes up and is put into main store if not already there, then it is placed on the TDQ in a position dependent on its priority. It then gains control of the processor and receives the message. The exact control of how long a task gains control of the processor, or how it moves through the task dispatching queue is not required to understand and implement the present invention. Further detail on multitasking can be found in IBM System/38 IMP Instructions, Formats and Functions, 1983, order number SC21-9037.

Figure 2:
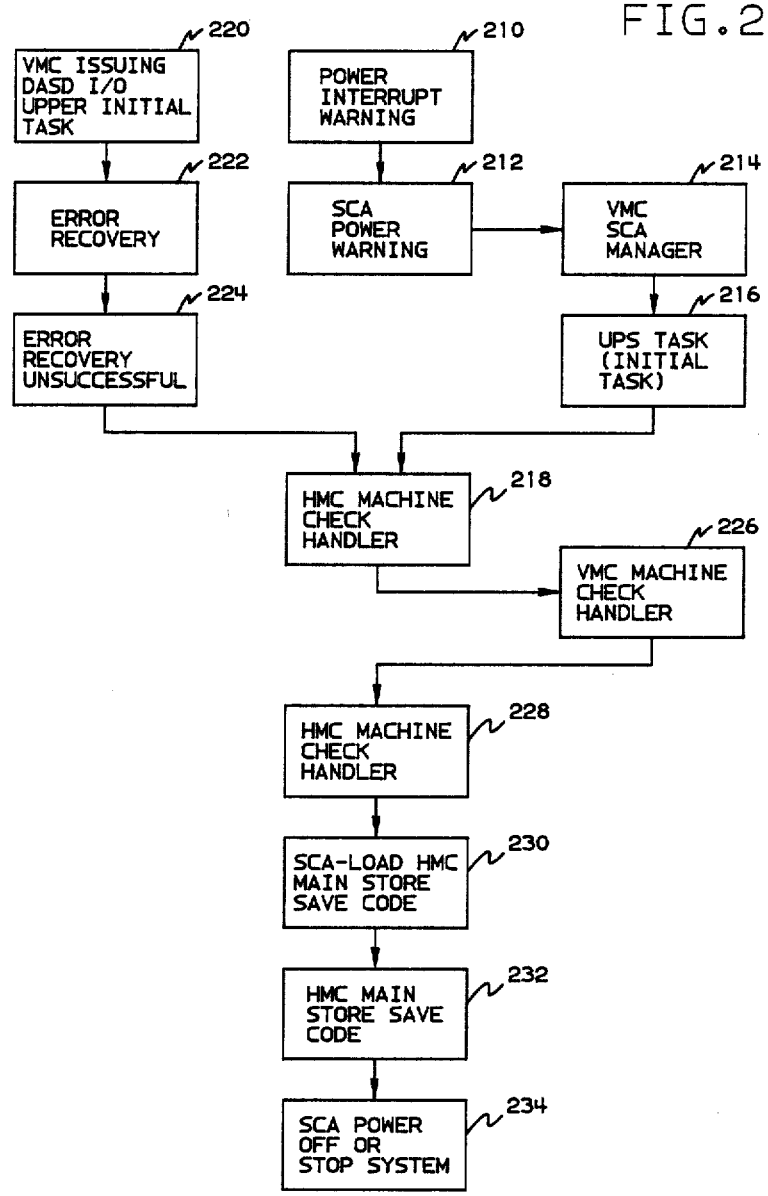
FIG. 2 is a task flow diagram of events leading to and including saving an image of main storage.

When a power failure occurs, as indicated in block 210 in FIG. 2, the SCA at 212 posts a utility power failure message to a send receive queue which causes a VMC SCA management task at 214 to be transferred to the TDQ. Some management functions are performed by a channel manager, but will be referred to as being done by the VMC SCA manager 214 for convenience because they really are SCA management functions. At times, the VMC SCA manager may be tied up with other responsibilities not related to the present invention, and the channel manager was available to perform such functions. When the VMC SCA manager task 214 obtains control of processor 12, it receives the utility power failure message from the SCA and sends a utility power failure message to a further send receive queue which wakes up a UPS task at 216 which is referred to as an initial task in control of the processor in the flow of FIG. 2. The manner in which tasks communicate will not be elaborated upon in subsequent text. The VMC SCA manager does not act directly on the utility power failure message because it performs other functions such as power on of printers, light displays, and packaging of request to the SCA.

The UPS task at 216 is VMC which periodically polls the SCA to determine the status of the utility power to the system. If utility power does not return in a preset time limit, it invokes an HMC machine check handler at 218 by means of sending an 809 machine check code, standing for, "utility power interrupted" to HMC. It is an instruction to terminate immediately. The user decides the length of the time limit as a function of the amount of back-up power available. The actual time limit used is then the user selected time minus an estimate of the time required to perform recovery functions as discussed below.

A further means by which the HMC machine check handler is invoked is if a problem with DASD I/O is encountered at VMC issuing DASD I/O at 220 under an initial task. A VMC error recovery program at 222 attempts error recovery on the DASD I/O. If it cannot recover the DASD I/O, there is a hardware problem. It then sends a machine check code at 224 to the HMC machine check handler at 218, such as an 828, 829, 82A, 82B, etc. These terminate immediate instructions are indicative of different types of hardware failures.

The machine check HMC at 218 locates a VMC machine check handler at 226 if the HMC determines that it received a first terminate immediate instruction. The machine check HMC increments a counter or flag indicating that a first terminate immediate instruction has been received and then passes control to the VMC machine check handler at 226. The machine check handler VMC, when it gains control of the processor saves restart status. Restart status for processor 12 involves ensuring that this VMC is the first task on the despatching queue and saving the point in the code which should be started at when the system in restarted. This code also brings into main storage key pages needed to assure a correct restart. These key pages are pinned (not permitted to leave main storage) when present in main store. They include the communication area in internal DASD, which is a fixed sector which is known to the system upon initialization. The sector is updated to contain the machine check code causing invocation of the VMC machine check handler. Also saved in this sector is a pointer to where a main store image will be saved. A further area is also pinned in main store. It is referred to as the MISR area, and contains flags, fields indicating VMC status, time, VMC engineering change level, system name and further information.

Restart status also includes control blocks and current registers which are saved in the task dispatching element for the task presently running on the system 12 which indicate where the system should restart. Flags are also set in the first page of mainstore to indicate that the image is usable for recovery of the system to the predetermined boundary. There are 16, 6 byte registers which tasks use, plus a location counter, or address register, indicating the next instruction in the task to be performed. The task dispatching element provides a storage area for the registers when the task is not running on processor 12. Other tasks not running on processor 12 already have task dispatching elements with this information. The information is usually used to swap tasks in and out of processor 12 in a standard manner.

VMC machine check handler at 226 then prepares the internal DASD save area for the save of the main storage image. This involves making sure that no abnormal conditions exist on the DASD. There may be some error recovery to perform with respect to recent I/O activity. Other tasks are also blocked from using the internal DASD. The VMC machine check handler is, at this time still sharing processor resources through the task dispatching queue. When it gains control of the processor again, it issues an instruction stopping other tasks from gaining control. It then calls the HMC machine check function at 228 with the original machine check code. That is, the utility power failure code, or the DASD failure code.

This time, the HMC machine check handler recognizes the code as being the second time that it occurred without the counter being reset. The above machine check codes are not handled by the VMC machine check handler as others can be. Sometimes the VMC machine check handler is able to resolve the other codes, and reset the counter. At this point, no more tasks are permitted to gain control of the processor, and the VMC machine check handler is positioned at the top of the task dispatching queue. Since no main storage changes may occur, (HMC runs out of control store) main storage is effectively frozen.

The HMC machine check handler then sends the machine check code directly to the SCA at 230, which detects this code as meaning main store needs to be saved. The SCA issues conventional DASD I/O to load HMC main store save code into the control store. HMC main store code at 232 on processor 12 then issues DASD I/O to copy main storage to the reserved section on the internal DASD. The main storage is saved in large chunks with comprehensive error recovery during the save. The HMC main store save code then saves the machine code, and a flag that main store is saved in the communication sector on internal DASD. When main store is saved, the HMC main store save code informs the SCA at 234 of successful saving of main store.

Figure 3:
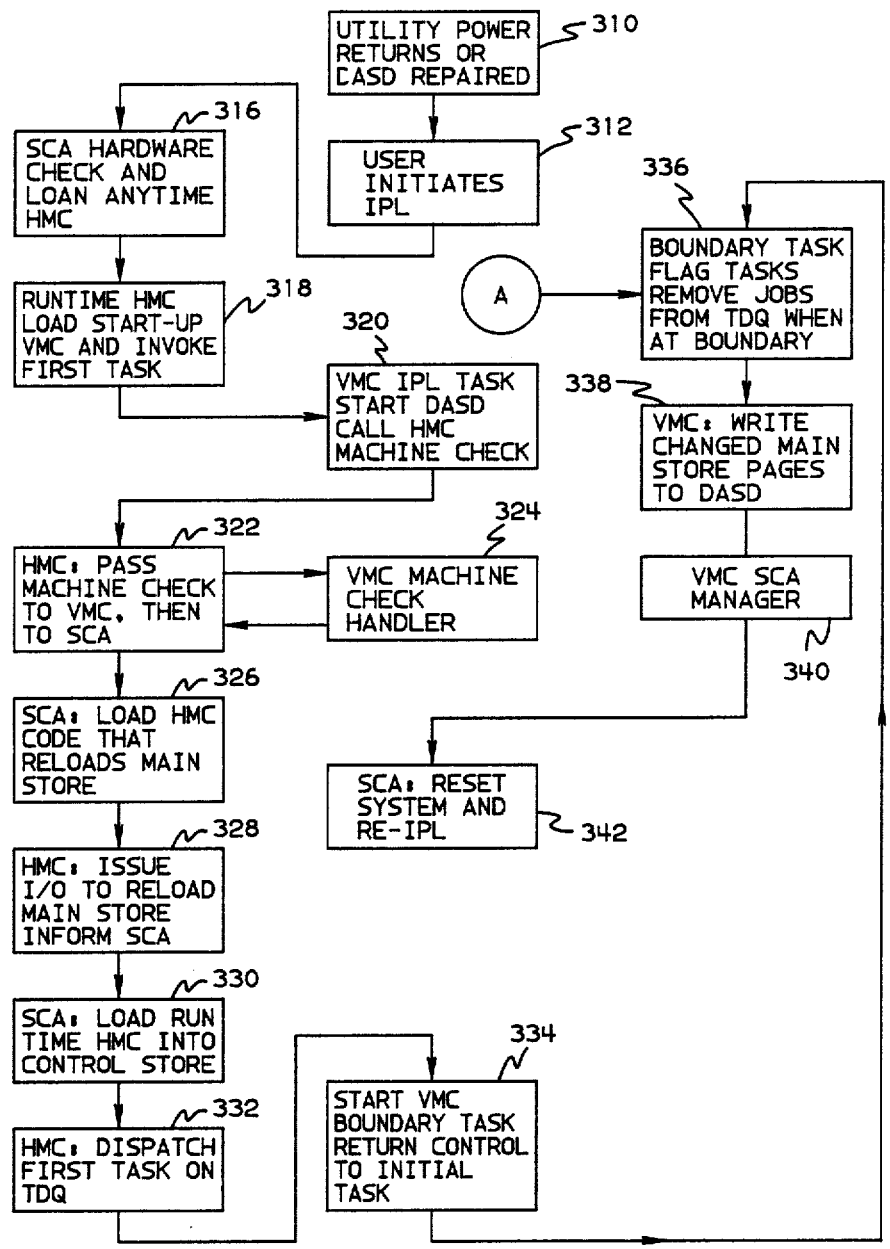
FIG. 3 is a task flow diagram of restarting the system and returning to normal processing following the saving an image of main storage in FIG. 2.
Figure 5:
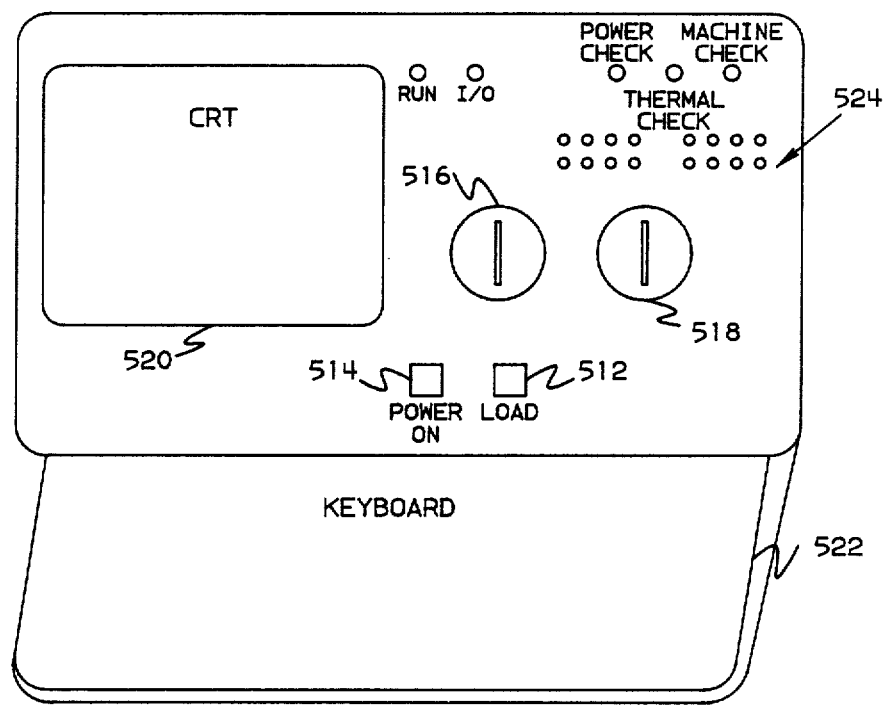
FIG. 5 is a perspective representation of the front panel of the system of FIG. 1.

After receiving the indication that main store is saved successfully, the SCA powers off the system if the machine check code is 809, utility power interrupted. If the machine check code is 828 et al, it stops the system and puts a machine check code in the console lights on the front of the system. This code indicates to service personnel what went wrong. When power returns, or the DASD problem is repaired, as indicated at 310 in FIG. 3, the user IPLs the system at 312. This is done either by pressing a load button 512 (FIG. 5) on the front panel in the case of repair of a DASD problem, or pressing a power on button 514 in the event power was turned off. The SCA, at 316, checks out hardware and loads runtime HMC at 318 from DASD to control store in a conventional manner. It then sets up hardware, loads VMC start-up code and invokes the first task on the dispatch queue, which is a VMC IPL task at 320.

The VMC IPL task starts al the DASD in the system. It checks the communication sector on the internal DASD that contains the dump area and determines that there is a copy of main store to be reloaded. It then calls the HMC machine check function at 322 with the 823 machine check code.

The HMC machine check function at 322 first passes the 823 machine check code to the VMC machine check handler at 324 which is in main store with the VMC start-up code. VMC 324 recognizes the 823 code as a non-fixable code, so it passes control back to the HMC machine check function at 322. HMC at 322 then passes the 823 code to the SCA at 326. The SCA detects the 823 as the special machine check code to reload main store. It loads HMC code at 328 into control store. This HMC code reloads mainstore from DASD into main store in large chunks efficiently with error correction in a manner similar to the saving of the main store image to DASD.

The HMC re-load code 328 issues DASD I/O to re-load mainstore from the reserved section of internal DASD as indicated in the communications are of the internal DASD. It then informs the SCA that main store is reloaded successfully.

The SCA at 330 then loads runtime HMC into control store. The runtime HMC at 332 dispatches the first task on the saved task dispatch queue. The first task is the VMC task that was carefully placed at the top of the TDQ and saved restart status for power failure or DASD error. VMC task 334 begins operating at the point in the task identified in its address register in its task dispatching element. It starts a boundary VMC task at 336 which stops user jobs at their next machine instruction boundary. Control is returned to the initial task, either the UPS task to return to monitoring for power failures or to the DASD I/O task to retry the failing DASD to complete the I/O function.

The boundary VMC task may also be invoked by direct action of the user in the event that the system is hanging at 408. Again, such a hang may be caused by a very long job tying up system resources, or a loop or wait state where the user is unable to exert control because of the higher priority of the task in the loop or wait state. The user dials a 9C setting in console rotary switches 516 and 518 in FIG. 5, and presses the load button at 512. The console also comprises a CRT 520, keyboard 522 and various lights useful for communicating system status to a user. The console also permits access to the SCA, there bypassing processor 12. A keyboard of other data entry means may also be used to communicate with the SCA.

Figure 4:
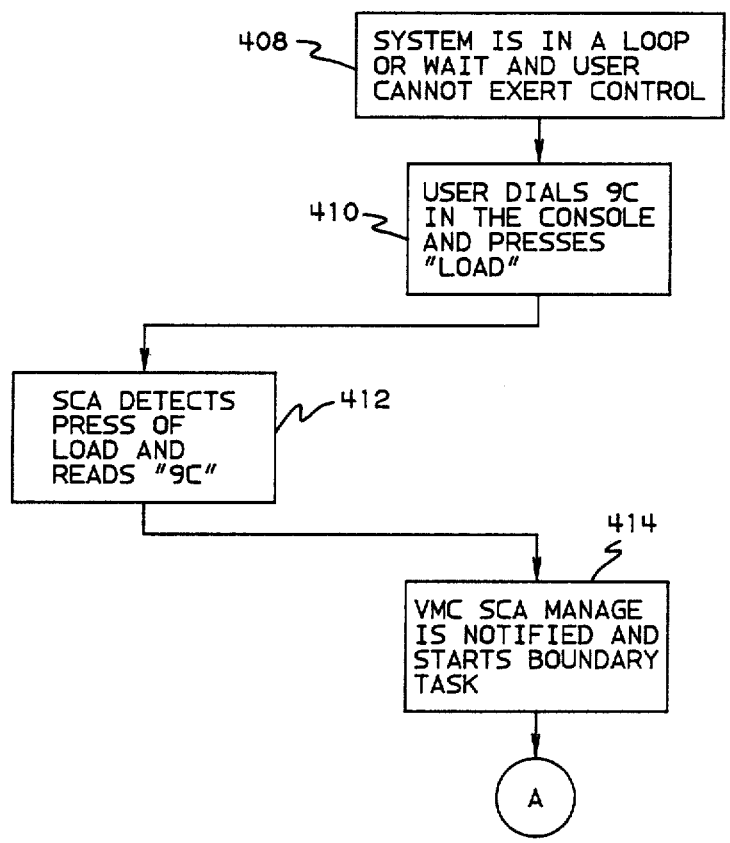
FIG. 4 is a task flow diagram of a system hang leading into the flow of FIG. 3.

Pressing the load button 512 after dialing 1 9C causes the SCA at 412 (FIG. 4) to detect the pressing of the load button. The SCA reads the console switch setting and sends a message to the VMC SCA manager indicating the 9C setting. The VMC SCA manager at 414 receives a message from the SCA indicating the user's request. The VMC SCA manager then starts the boundary VMC task at 336 in FIG. 3 as indicated by a large "A" in a circle on each Figure logically coupling the flow of FIG. 4 to FIG. 3.

The boundary VMC task searches through the system chain of tasks and sets a flag in the task dispatching element of the job that HMC detects and causes an interrupt at a machine instruction boundary.

When a job reaches the boundary, the interrupt invokes a VMC interrupt program in the job at 818 that removes the job from the dispatch queue and sets a flag in the task dispatching element of the job to indicate that it has reached the boundary and has been removed from the task dispatching queue. The next task on the queue is then dispatched by runtime HMC. During the time that jobs are permitted to run to the boundary, 3F05 is displayed in system lights on the console indicated generally at 524, to inform the user what is occurring.

The boundary task wakes up every 2 seconds in response to an internal clock to determine if every job has reached the boundary. If the boundary reached flag set by the interrupt program is on in the job, the job has reached the boundary. As stated before, all tasks are linked with pointers to the next task. The boundary task uses this linking to search all the tasks in the chain. It first determines if the task is a job from information in the task dispatching element in every task. The task dispatching element in FIG. 9 contains the linking information at 916 and the above flags at 924.

It is the task dispatching element which is actually on the task dispatching queue during normal operation. If the task is a job, as indicated in the description 912, the boundary task then checks to see if it has reached the boundary by checking the boundary flag. When the boundary task finds a job not yet at the boundary, further tasks are dispatched from the task dispatching queue for continued processing. When all jobs have reached the boundary as indicated by a successful search through the entire chain of tasks, the interrupt task calls VMC terminate machine code which writes all changed main store pages to their DASD locations in a conventional manner and then sends a message to invoke the SCA through the VMC SCA manager at 340. The SCA at 342 resets the system hardware and then re-IPLs the system in the same manner as at blocks 312-320 with the exception of the machine check function call. The system is ready to accept tasks onto the task dispatching queue for normal operation. The logical files are consistent with the data they cover because in-process instructions were allowed to complete data and logical file changes which may have been interrupted.

Figure 6:
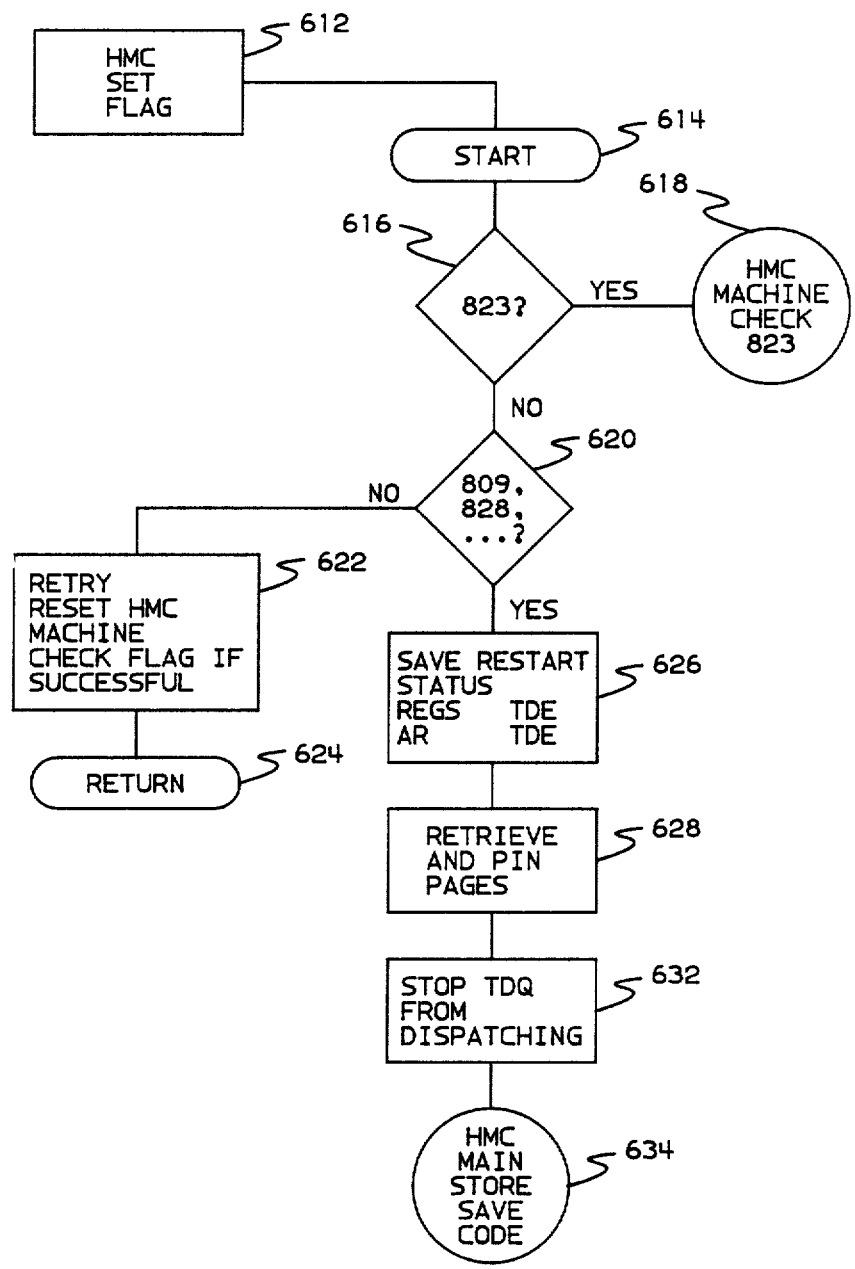
FIG. 6 is a flow diagram of a machine check handler of FIGS. 2 and 3.

FIG. 6 is a detailed flow diagram describing the flow in VMC machine check handler 226 (FIG. 2) as it relates to the present invention. Upon setting of the machine check flag or counter at 612 in the HMC machine check handler, the VMC machine check handler is started at 614. If the machine check code passed by the HMC machine check handler is an 823 at decision block 616, control is passed back to the HMC machine check handler at 618 because the VMC recognizes that it does nothing with respect to a reload main store machine check code.

If the machine check code is not related to utility power failure, or DASD failure as previously discussed, decision block 620 sends flow to a retry block 622. Retry block 622 performs a number of error recovery techniques depending on the machine check code. If successful, it resets the HMC machine check flag or counter and returns control to an initial task at 624.

If the machine check code is related to utility power failure, or DASD failure as discussed above, decision block 620 routes flow to a block 626 for saving restart status. A block 628 then retrieves and pins pages desired for restoring the main store image.

Flow at block 632 then stops the TDQ from dispatching any further tasks to ensure that when main store is saved, the VMC machine check handler will be the first task in the TDQ. HMC main store save code is then invoked at 634.

Figure 7:
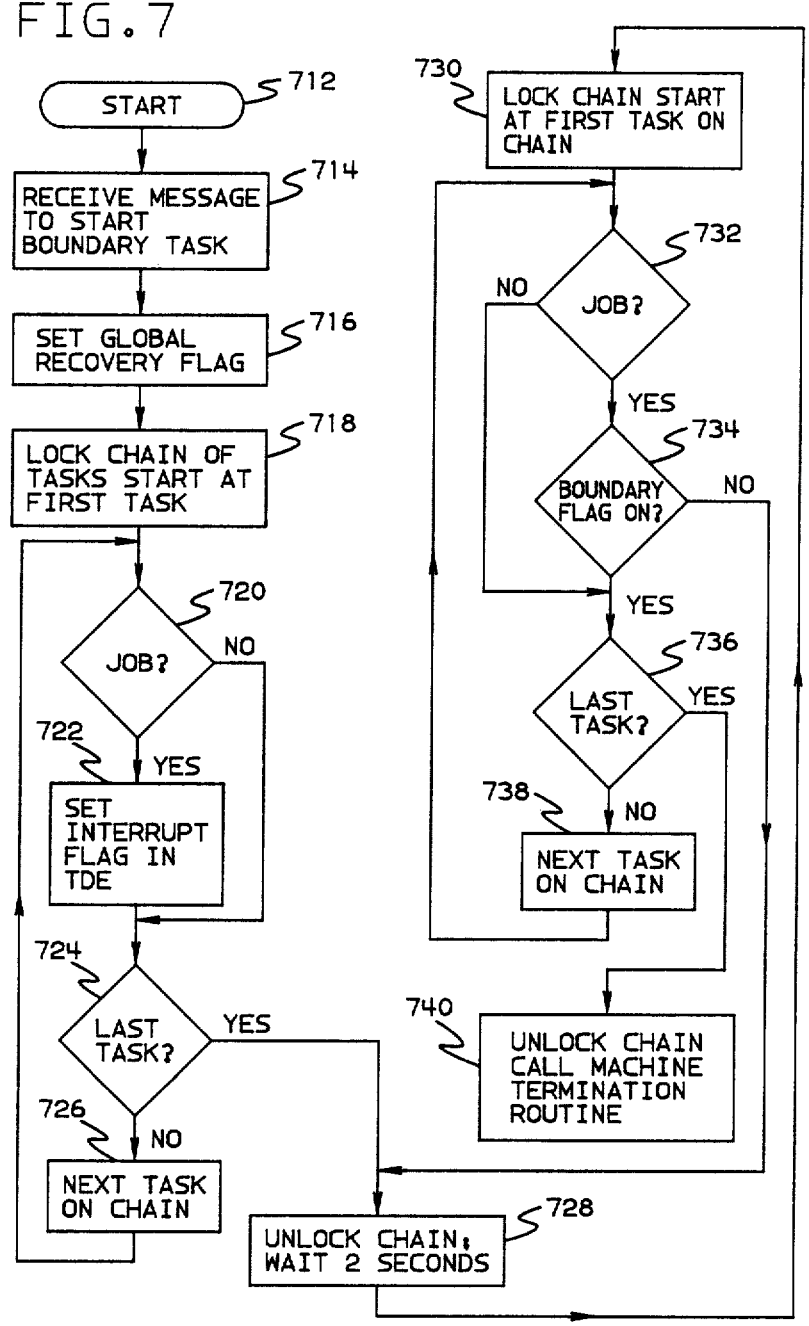
FIG. 7 is a flow diagram of a boundary task of FIG. 3.

The Boundary VMC task flow responsible for monitoring jobs and removing them from the TDQ is shown in FIG. 7. Starting 712 at block 714, the task receives a message from block 334 or 414 to start. A global recovery flag is set at 716 for access by all tasks. The first task in the system chain of tasks is found at 718, and if it is a job, 720, a boundary interrupt flag is set in the job's task dispatching element (TDE) at 722. If the job is at the boundary, an at boundary flag is also set. If is not a job, block 724 determines if it is the last task in the chain.

If the task is not the last task in the chain as determined at 724, the next task on the chain is found at 726, and flow is returned to block 720 to ask the same questions of the next task. When the last task on the chain is encountered at 724, a wait is entered at 728. The chain of tasks is locked to prevent the chain from changing until the search is completed.

Figure 8:
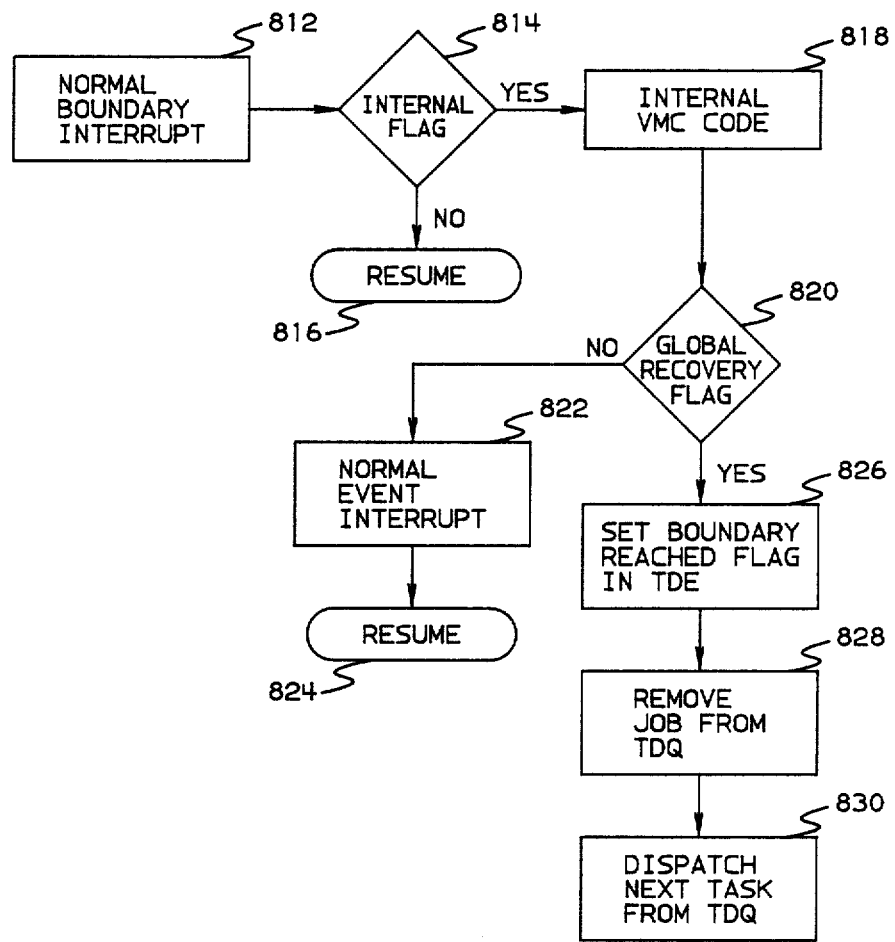
FIG. 8 is a diagram of a job following interruption at the boundary.

During the wait, two seconds of processor time in the preferred embodiment, other tasks are permitted to run in a normal manner as to be described with respect to FIG. 8. In FIG. 7, following the two second wait at 728, the task wakes up at 730 and again starts at the first task in the system chain of tasks. The task then identifies if each job has reached the predetermined boundary so that logical files are known to be synchronized with their related data. A predetermined number of wait states will occur before it is recognized that a job will take too long to reach a boundary. It is thought better to have to rebuild some logical files as opposed to running recovery for a long time.

First, the tasks are queried at 732 to determine if they are jobs If a task is a job, it is queried to determine if its boundary flag is on at block 734. The boundary flag is set in FIG. 8 when a job reaches the predetermined boundary. If the boundary flag is not on, the wait block 728 is entered again because all jobs have not reached the boundary. If the flag is on, or the task was not a job at 732, and the task is not the last task on the chain at 736, the next task on the chain is found at 738. Flow is then returned to block 732 to search for further jobs not at the boundary. When the entire chain of tasks has been searched by blocks 732 through 738, and all jobs were at the boundary, a VMC machine termination routine is called at block 740.

In FIG. 8, when a task reaches a boundary, a normal boundary interrupt occurs at 812. If no internal flags are set, as identified at 814, the task resumes activity at 816. If the boundary interrupt flag is set, internal VMC code is invoked at 818 to determine what flags are set. If the global recover flag available to all tasks is not set, as indicated at 820, or the task is not a job, normal event interrupt processing occurs at 822 and the task resumes at 824. Normal event interrupt processing involves receiving messages, and other common event processing.

If the global recover flag was determined to be on at 820, the job's at boundary flag is set in its TDE at 826. The job is then removed from the task dispatching queue at 828. The next task is then dispatched from the TDQ at 830. The next task to reach the boundary starts at 812 again.

While the invention has been described with respect to one or more embodiments, it will be recognized by those skilled in the art that the invention is not limited to the embodiments described. Further variations on the invention include, but are not limited to, interrupting processes at various predetermined boundaries. One such variation would allow jobs and tasks to resume normal execution, after restart, as if no failure had occurred. Users of the invention include people and processes. One could easily contemplate automatic IPL and power on features incorporating the present invention. Further embodiments could be generated without departing from the spirit and scope of the invention as described and claimed.

What is claimed is:

1. A method of restarting a computer system in the event of a failure, the computer system running jobs and having directories relating to data, a main storage area, and at least one direct access storage device, the method comprising the steps of:
   detecting the failure;
   saving an image of main storage into a nonvolatile storage area in response to detection of the failure;
   correcting the failure;
   reloading the main storage image into said main storage after correction of the failure;
   marking jobs for interruption at a predetermined system boundary; and
   running jobs for a predetermined time to permit jobs to attain the predetermined system boundary such that directories are in a known state.

2. A method of restarting a computer system in the event of an undesirable condition, the computer system having logical files relating to data stored on a plurality of storage devices, and tasks and jobs running on the system from a main storage, the jobs having the capability to change logical files when running below a predetermined logical boundary, the method comprising the steps of:
   detecting the undesirable condition which has not yet caused a data loss;
   saving an image of main storage into a nonvolatile storage area;
   correcting the undesirable condition;
   reloading the main storage image into said main storage;
   marking jobs for interruption at the predetermined logical system boundary; and
   running jobs for a predetermined time to permit most jobs to attain the predetermined system boundary jobs such that logical files are in a known state.

3. The method of claim 2 wherein a machine check task is in control of the system prior to the step of saving an image of main storage and wherein the machine check task prevents other tasks from gaining control of the system.

4. The method of claim 3 wherein, the saved image of said main storage contains an indication of the job to begin operation with when said main storage is reloaded, and an indication of what point in the task to begin operating.

5. The method of claim 2 wherein during the predetermined time, jobs having reached the boundary are so marked.

6. The method of claim 5 wherein the jobs are logically chained together and periodically searched to determine if they are marked as having reached the boundary.

7. The method of claim 6 wherein upon the search finding all jobs having been marked as reaching the boundary, the system is reset with initialization programming.

8. A computer system having data directories relating to data stored on said system, the system having a main working storage area which has a job queue from which jobs are selected for operation upon by the system, and at least one selected for operation upon by the system, and at least one nonvolatile storage device, the system being restartable following an undesirable system condition, the system comprising:
   means for interrupting the system from operating on the jobs;
   means responsive to the means for interrupting the system for saving an image of said main working storage including a representation of the status of the system with respect to the job the system is presently operating upon;
   means coupled to said main working storage for reloading the image of said main working storage following correction of the undesirable system condition;
   means coupled to said main working storage for marking jobs for interruption at a predetermined system boundary, above which data directories are not normally changed;
   means coupled to said main working storage for restarting system operation on jobs where the jobs were interrupted using the reloaded main working storage image; and
   means coupled to said main working storage for monitoring jobs running on the system to determine when the jobs have reached the predetermined system boundary such that directories are in a known state.

9. A computer system having data directories relating to data stored on said system, the system having a main working storage area which has a task queue from which tasks and jobs are selected for operation upon by the system, wherein jobs are tasks capable of changing directories, the system comprising:
   means coupled to said task queue for marking jobs in the queue for interruption at a predetermined system boundary, above which data directories are not normally changed; and means coupled to said task queue for monitoring jobs running on the system to determine when the jobs have reached the predetermined system boundary such that directories are in a known state.

10. The computer system of claim 9 wherein tasks are linked by address information, forming a list, and each job on the task queue is represented by a task dispatching element comprising task identification information and linkage information.

11. The computer system of claim 10 wherein each task dispatching element contains a boundary interruption flag which is set by the means for marking jobs if the task is a job to be interrupted at the boundary.

12. The computer system of claim 11 and further comprising means coupled to the task dispatching queue for removing jobs from the task dispatching queue upon said jobs reaching the boundary.

13. The computer system of claim 12 wherein the means for removing jobs sets a job reached boundary flag in the task dispatching element of each job reaching the boundary if the boundary interruption flag is set.

14. The computer system of claim 13 wherein the means for monitoring jobs periodically searches through the linked list of tasks to determine fi the job reached boundary flag in the jobs in the linked list is set.

15. The computer system of claim 14 wherein processing of tasks on the task dispatching queue continues when the means for monitoring jobs encounters a job in the linked list which does not have its job reached boundary flag set.

* * * * *